(12) United States Patent
Tanaka et al.

(10) Patent No.: US 8,523,412 B2
(45) Date of Patent: Sep. 3, 2013

(54) VEHICLE DOOR HANDLE APPARATUS

(75) Inventors: Tomoya Tanaka, Kanagawa-ken (JP);
Makoto Igeta, Kanagawa-ken (JP)

(73) Assignee: Alpha Corporation, Yokohama-Shi, Kanagawa-Ken (JP)

( * ) Notice: Subject to any disclaimer, the term of this patent is extended or adjusted under 35 U.S.C. 154(b) by 400 days.

(21) Appl. No.: 13/119,372

(22) PCT Filed: Mar. 29, 2010

(86) PCT No.: PCT/JP2010/055557
§ 371 (c)(1),
(2), (4) Date: Mar. 16, 2011

(87) PCT Pub. No.: WO2010/113867
PCT Pub. Date: Oct. 7, 2010

(65) Prior Publication Data
US 2011/0170305 A1 Jul. 14, 2011

(30) Foreign Application Priority Data
Mar. 30, 2009 (JP) ................. P2009-081583

(51) Int. Cl.
*B60Q 1/00* (2006.01)
(52) U.S. Cl.
USPC ........ 362/501; 16/412; 362/100; 362/249.05; 362/311.02
(58) Field of Classification Search
USPC .......... 362/100, 234, 249.02, 249.05, 311.02, 362/501; 16/412; 292/1
See application file for complete search history.

(56) References Cited

U.S. PATENT DOCUMENTS

| | | | | |
|---|---|---|---|---|
| 3,280,321 A | * | 10/1966 | Overesch | 362/100 |
| 2003/0095416 A1 | | 5/2003 | Huizenga | |
| 2010/0077805 A1 | * | 4/2010 | Mueller et al. | 362/501 |

FOREIGN PATENT DOCUMENTS

| | | |
|---|---|---|
| DE | 102007016351 A1 | 10/2008 |
| JP | 2002-240626 A | 8/2002 |
| JP | 2004-224314 A | 8/2004 |
| JP | 2005-282205 A | 10/2005 |
| JP | 2006-009279 A | 1/2006 |
| JP | 2006-009352 A | 1/2006 |
| JP | 2006-037378 A | 2/2006 |
| JP | 2006-137330 A | 6/2006 |
| JP | 2006-324623 A | 11/2006 |
| JP | 2009-007413 A | 1/2009 |
| WO | 2008137634 A1 | 11/2008 |

OTHER PUBLICATIONS

Official Action issued on Oct. 23, 2012, in the counterpart European Application 10758638.0.

* cited by examiner

*Primary Examiner* — Stephen F Husar
(74) *Attorney, Agent, or Firm* — Nath, Goldberg & Meyer; Jerald L. Meyer (57) ABSTRACT

A door handle apparatus includes: a handle base (2) secured to a vehicle door (1); an operation handle (3) freely rotatably coupled to the handle base (2); and a lighting device (6) including a light emitting element (5) that emits light by being fed with power through wire harnesses (4) inserted through an inside of the operation handle (3). An irradiation opening (7) is formed on a sidewall of the operation handle (3), which is opposite to the ground in a state where the operation handle (3) is attached onto the door (1). The lighting device (6) is formed in a lens portion (9) sealing the light emitting element (5) in cooperation with sealing resin (8), and is secured to the operation handle (3) by fitting, to the irradiation opening (7), a fitting protruding portion (10) having a shape coinciding with the irradiation opening (7).

8 Claims, 6 Drawing Sheets

VEHICLE DOOR HANDLE APPARATUS

This is a National Phase Application filed under 35 U.S.C. §371 as a national stage of PCT/JP2010/055557, filed on Mar. 29, 2010, an application claiming the benefit under 35 U.S.C. §119 from Japanese Patent Application No. P2009-081583 filed on Mar. 30, 2009, the content of each of which is hereby incorporated by reference in its entirety.

TECHNICAL FIELD

The present invention relates to a vehicle door handle apparatus.

BACKGROUND ART

One described in Patent Document 1 is known as a door handle apparatus that performs foot lighting by fixing a lighting source (lighting device) to a door handle (operation handle) attached to a vehicle door.

However, in the above-mentioned conventional example, since the operation handle is used while being exposed to the outside, there is a disadvantage that an occurrence of a short circuit and the like owing to entrance of rainwater, wash water and the like cannot be prevented if such a lighting device as an LED is only attached onto the operation handle.

This problem is attempted to be solved by incorporating a sealed lighting device into the operation handle as in an invention described in Patent Document 2. However, this lighting device of the conventional example is formed by closing an opening of a switch case storing the LED therein by means of a diffusing member. Therefore, a joint portion between the case and the diffusing member that closes the opening of the case is provided, and accordingly, a structure of the lighting device is complicated. Moreover, two-color molding or a joining step of the diffusing member is required, and so on, and accordingly, a manufacturing process of the lighting device becomes complicated. Furthermore, a quantity of light irradiated toward the foot is decreased owing to a loss of a light quantity in the joint portion, and accordingly, there occurs a necessity to increase an output of the LED.

PRIOR ART DOCUMENTS

[Patent Documents]

[Patent Document 1] Japanese Patent Laid-Open Publication No. 2004-224314

[Patent Document 2] Japanese Patent Laid-Open Publication No. 2006-9279

DISCLOSURE OF THE INVENTION

The present invention has been made in order to solve the above-described disadvantages. It is an object of the present invention to provide a vehicle door handle apparatus capable of illuminating the foot by means of a simple structure.

A handle apparatus is composed by including: a handle base secured to a vehicle door; an operation handle freely rotatably coupled to the handle base; and a lighting device including a light emitting element that emits light by being fed with power through wire harnesses inserted through an inside of the operation handle, and an irradiation opening is formed on the operation handle.

The irradiation opening is formed on a sidewall of the operation handle, which faces to the ground, in a posture where the handle apparatus is attached onto the door, and the lighting device is attached so that a fitting protruding portion of a lens portion can be fitted to this irradiation opening.

When the lighting device is allowed to emit light in such an attached state, a region immediately under the operation handle, that is, the ground is irradiated, and a user can be informed of the presence of a puddle and the like.

The lighting device is formed by sealing the light emitting element together with the lens portion by sealing resin. Accordingly, though a structure of the lighting device is simple, an occurrence of malfunction such as a short circuit can be surely prevented even in the case where rainwater and the like enter the operation handle.

Moreover, the operation handle is formed by coupling a front cover and a back cover to each other, the front cover including a harness insertion groove through which the wire harnesses are inserted, and allowing the irradiation opening to be formed on a sidewall thereof forming the harness insertion groove therein, and the back cover closing the harness insertion groove. In addition, the lighting device is secured to a predetermined position by sandwiching a flange portion formed on a base end of the fitting protruding portion between an inner wall surface of the harness insertion groove and the back cover. In such a way, the door handle apparatus may be composed. In this case, fixing work of the lighting device is finished only in such a manner that the fitting protruding portion of the lens portion is fitted from inward of the harness insertion groove to the irradiation opening and is then temporarily held, and subsequently, the back cover is coupled to the front cover. As a result, a fastening operation of a screw and the like is not necessary for such a fixing operation of the lighting device, and accordingly, operability is enhanced. Moreover, the lighting device is attached in a state where the flange portion is sandwiched between the front cover and the back cover, and accordingly, a rattle and the like are completely regulated, and an occurrence of an unusual sound and the like during running of the vehicle can be prevented.

Furthermore, a surface of the lens portion is arranged at a position a little deeper from a peripheral edge of the irradiation opening, whereby an occasion where the surface of the lens portion is scratched is reduced, and a loss of an irradiated light quantity, which may be caused by that such a lens surface is scratched, can be thereby reduced. Accordingly, a good lighting effect can be exerted for a long period.

Moreover, when the lens portion is formed by performing injection molding for translucent resin in which a light diffusing agent is diffused, light irradiated from the lens portion, that is, the irradiation opening becomes diffused light. Accordingly, it becomes possible to illuminate a wide range around the foot. In addition, reduction of the irradiated light quantity to the ground, which may be caused by the fact that the above-mentioned lens portion surface is retreated, or clear reflection of an outline of the irradiation opening to the ground can be restricted.

Furthermore, when an operation switch is arranged adjacent to the lighting device in the operation handle, the periphery of the operation switch can be shone by using light leakage from the lighting device. Accordingly, the user can be informed of a position of the operation switch.

As described above, in accordance with the present invention, the vehicle door handle apparatus can be obtained, which is capable of illuminating the foot by means of the simple structure.

BRIEF DESCRIPTION OF THE DRAWINGS

FIGS. 1(a) and 1(b) are views showing a vehicle door handle apparatus according to an embodiment of the present invention.

FIGS. 2(a) and 2(b) are views showing the door handle apparatus of FIGS. 1(a) and 1(b)

FIGS. 4(a) to 4(c) are views showing an LED unit of the door handle apparatus of FIGS. 1(a) and 1(b)

FIGS. 5(a) and 5(b) are views showing an assembled state of the door handle apparatus of FIGS. 1(a) and 1(b)

FIGS. 6(a) to 6(c) are views showing an attached state of the LED unit of the door handle apparatus of FIGS. 1(a) and 1(b)

BEST MODE FOR CARRYING OUT THE INVENTION

Figure 1:
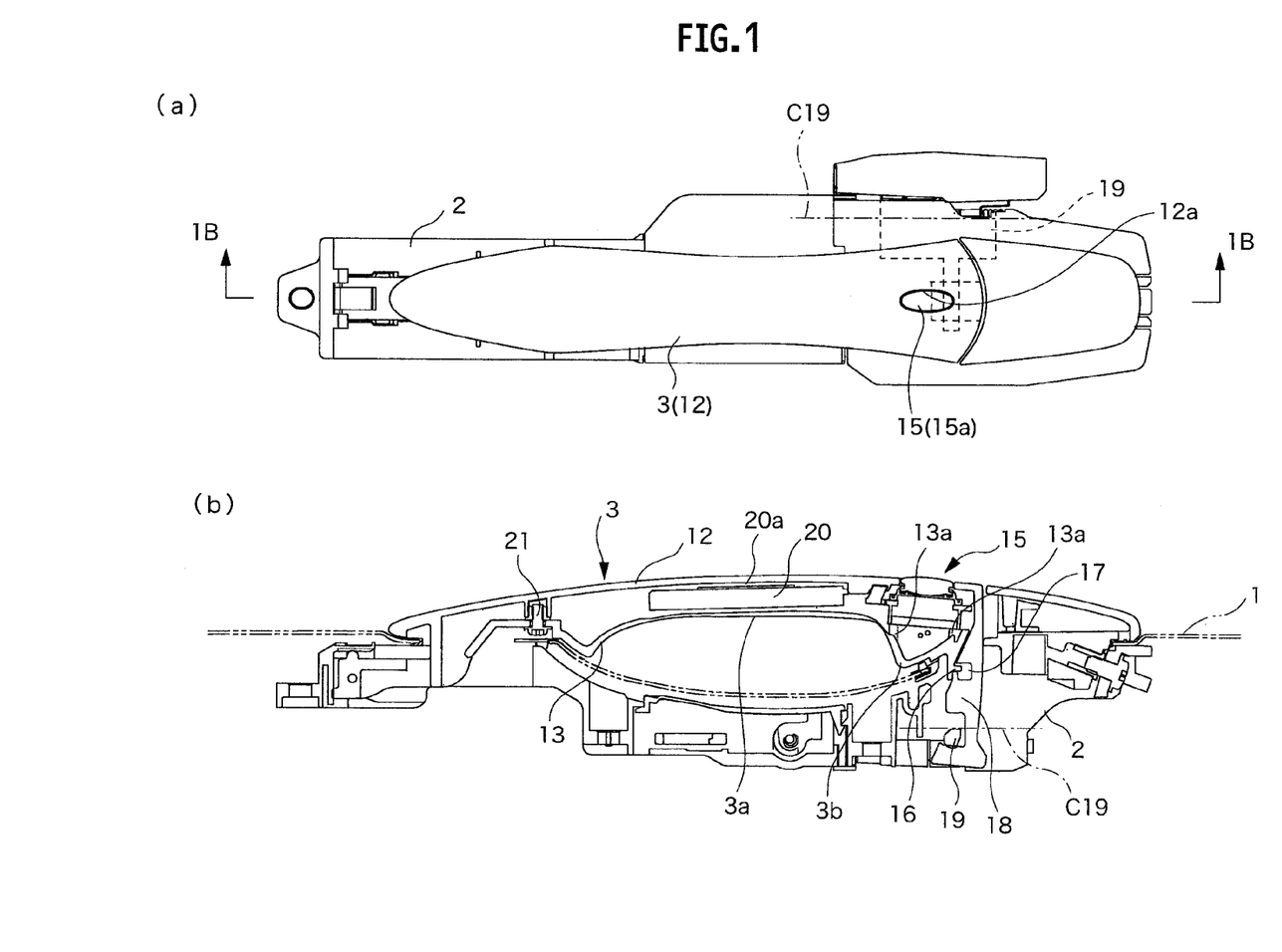
FIG. 1(a) is a plan view of the vehicle door handle apparatus.
FIG. 1(b) is a cross-sectional view along a line 1B-1B.
Figure 2:
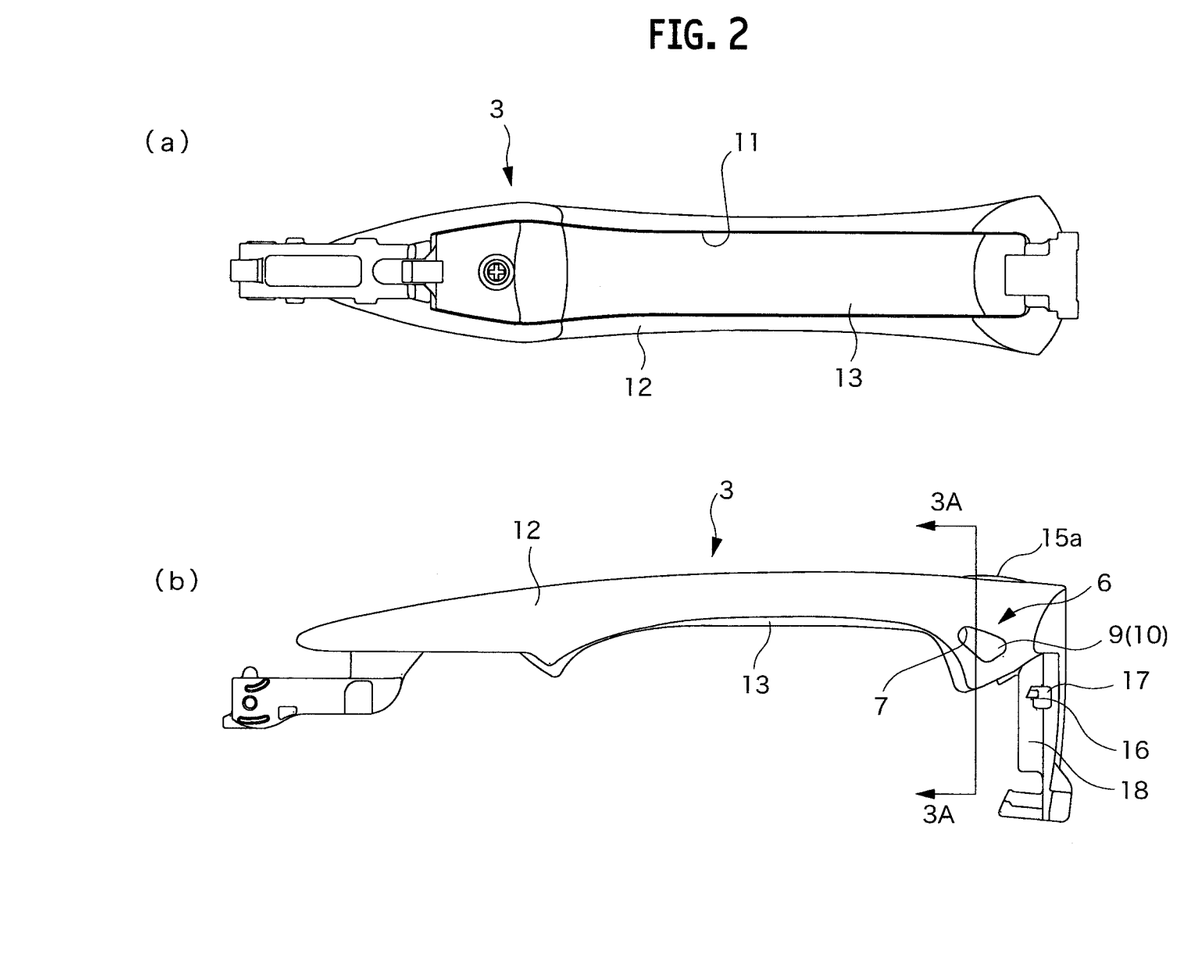
FIG. 2(a) is a back view.
FIG. 2(b) is a side view.

As shown in FIG. 1(a) to FIG. 6(c), a vehicle door handle apparatus includes: a handle base 2 secured to a vehicle door 1; and an operation handle 3 coupled to the handle base 2. In this embodiment, the operation handle 3 is formed as a so-called grip-type handle that allows one end to be coupled freely rotatably to the handle base, and is operated by gripping a grip portion 3a as a midpoint portion. The operation handle 3 is attached to the vehicle door 1 in a horizontal posture in which a left side in FIG. 1(a) is directed forward of a vehicle.

In the operation handle 3, an operation leg portion 18 is provided, which protrudes into an inside of the door 1 from an opposite end to a rotation end, and moves in a thickness direction following a rotation operation of the operation handle 3. Moreover, on the handle base 2, a lever 19 engaged with the operation leg portion 18 is axially supported about a rotation axis C19 so as to be freely rotatable. The lever is rotationally driven following the movement of the operation leg portion 18, and actuates a door lock apparatus (not shown) arranged in the door 1.

The above-described operation handle 3 includes : a front cover 12 that has and allows a harness insertion groove 11 opened in a back surface direction to be passed therethrough in a longitudinal direction; and a back cover 13 that leaves a wiring space in an inside thereof, is fitted to the harness insertion groove 11 of the front cover 12, and closes such an opening of the harness insertion groove 11. Note that, in this embodiment, "front and back" and "upper and lower" are determined while taking, as a reference, an attached posture of the door handle apparatus to the vehicle, and a side in a frontward direction with respect to the door 1 is defined as a "front side", and a side in an interior direction with respect thereto is defined as a "back side".

Into the harness insertion groove 11 of the front cover 12, there are housed and secured: an antenna 20 for performing communication with a portable instrument owned by a user; an operation switch 15 for allowing the user to perform a lock operation; and an LED unit as a lighting device 6. Before a coupling operation of the back cover 13, the above-described antenna 20 is secured in advance to a center portion of a back surface of a front wall of the front cover 12 by using an adhesive tape 20a, an adhesive or the like. The operation switch 15 and the LED unit 6 are temporarily held on the front cover 12, and are secured to predetermined positions while a shake and the like thereof are being regulated by fixation of the back cover 13.

Moreover, the above-described antenna 20 and the like are subjected to waterproof treatment by appropriate means, and a short circuit and the like at the time of entrance of water into the operation handle 3 are prevented. Moreover, wire harnesses 4 taken out from the respective components are introduced into the inside of the door 1 from a front end portion of the operation handle 3 through the harness insertion groove 11, and are thereafter connected to an onboard computer (not shown).

Furthermore, the operation switch 15 and the LED unit 6, which are described above, are arranged at a rear end portion of the operation handle 3. In this embodiment, the operation switch 15 is formed of a push-button switch, and an operation button 15a is exposed to the outside from a button-ready opening 12a formed on the front wall of the front cover 12.

Meanwhile, at the rear end portion of the operation handle 3, a swelling portion 3b that protrudes to a back surface side is formed, and the LED unit 6 is arranged at a position adjacent to the operation switch 15 by this swelling portion 3b. This LED unit 6 is prepared as a foot lighting device that lights the ground near the door 1. On a sidewall portion of the front cover 12 on a side facing to the ground, an irradiation opening 7 for irradiating therefrom light irradiated from the LED unit 6.

As shown in FIGS. 4(a) to 4(c), the LED unit 6 includes: a mounted board 6a on which an LED (light emitting element 5) is mounted; and a lens portion 9 that also serves as a case for housing the mounted board 6a therein. The lens portion 9 is formed by performing injection molding for a translucent resin material in which a light diffusing agent is diffused, and an inside of the lens portion 9 is sealed by using sealing resin 8 after housing the mounted board 6a therein (refer to FIG. 3).

Moreover, on the lens unit 9, a fitting protruding portion 10 is protruded, which has substantially the same shape as an opening shape of the above-described irradiation opening 7, and is fitted to the irradiation opening 7. A flange portion 14 is formed on a base end of the fitting protruding portion 10, and regulates outward detachment of the LED unit 6 at the time of inserting the fitting protruding portion 10 into the irradiation opening 7 from inward of the front cover 12.

Note that, for the purpose of facilitating the understanding, in FIG. 4(c), the LED 5 on the mounted board 6a is shown by a solid line; the LED 5 is mounted on a mounting surface, that is, a surface on a side where the fitting protruding portion 10 is formed.

Assembly of the operation handle 3 is first performed by coupling and fixing the back cover 13 to the front cover 12 that temporarily holds the operation switch 15 and the LED unit 6 as shown in FIG. 5(b). The coupling of the back cover 13 is performed in such a manner that an engaging portion 16 protruded on a rear end of the back cover 13 is allowed to engage with a hole-like engaged portion 17 of the front cover 12, thereafter, the back cover 13 is rotated about such an engagement region taken as a rotation center, a front end of the back cover 13 is then superposed onto the front cover 12, and further, a screw 21 is screwed into the front end portion of the operation handle 3.

As shown in FIGS. 5(a) to 6(c), on a sidewall of the back cover 13 on a side onto which the LED unit 6 is attached, a fitting notch 22 is provided, onto which the flange portion 14 of the lens portion 9 is fitted. A retaining surface 22a is formed on three side portions on the periphery of the fitting notch 22. The retaining surface 22a thrusts the flange portion 14 in the LED unit 6 from inward in a state where the back cover 13 is coupled to the front cover 12, and prevents the shake and the like of the LED unit 6 (refer to FIG. 3).

Hence, in this embodiment, first, the fitting protruding portion 10 of the LED unit 6 is fitted to the irradiation opening 7 of the front cover 12, and subsequently, the operation switch 15 is attached so as to go along the flange portion 14 of the LED unit 6. Then, the detachment of the LED unit 6 is regulated by the operation switch 15, and such a temporarily held state thereof is maintained. In order to couple the back cover 13 to the front cover 12 from this state, the engaging portion 16 of the back cover 13 is inserted into the engaged portion 17 in a diagonal direction. Then, the retaining surface 22a on a rear edge side of the fitting notch 22 first thrusts a region of the flange portion 14, which corresponds thereto, and thereby regulates the shake of the LED unit 6.

Thereafter, when the back cover 13 is rotated, the other retaining surfaces 22a sequentially thrust the flange portion 14, and thereby regulate the shake. Moreover, the push-button switch 15 is secured in such a manner that a back surface thereof is thrust by a thrusting protruding portion 13a protruded on the back cover 13 in a state where the back cover 13 is secured. For the purpose of facilitating the understanding, such pressed portions of the LD unit 6 by the back cover 13 are shown by implementing hatching therefor.

Figure 3:
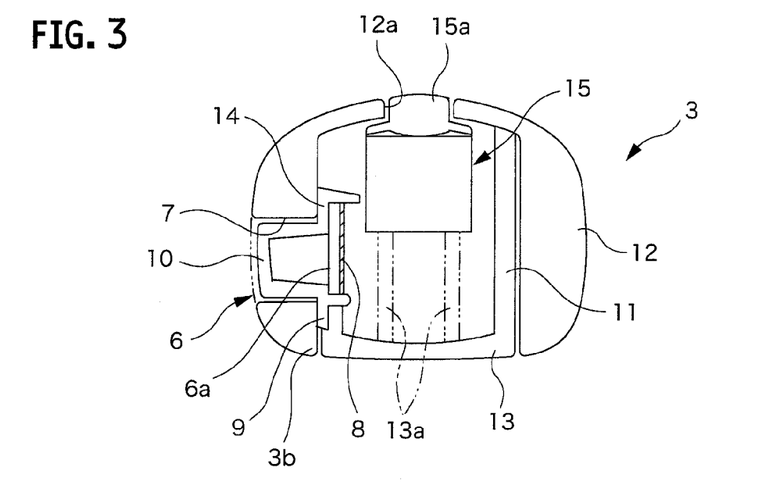
FIG. 3 is a cross-sectional view along a line 3A-3A of FIG. 2(b).
Figure 4:
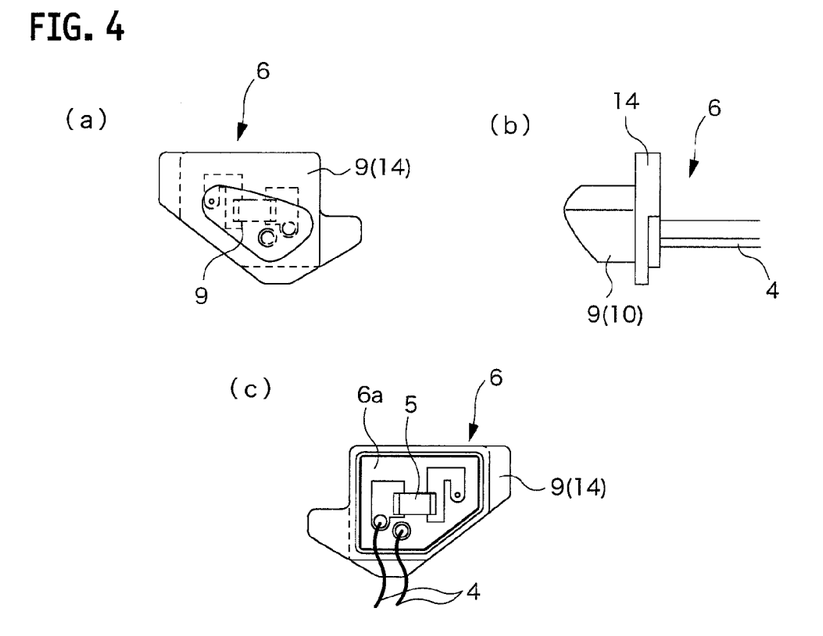
FIG. 4(a) is a plan view.
FIG. 4(b) is a side view.
FIG. 4(c) is a back view.
Figure 5:
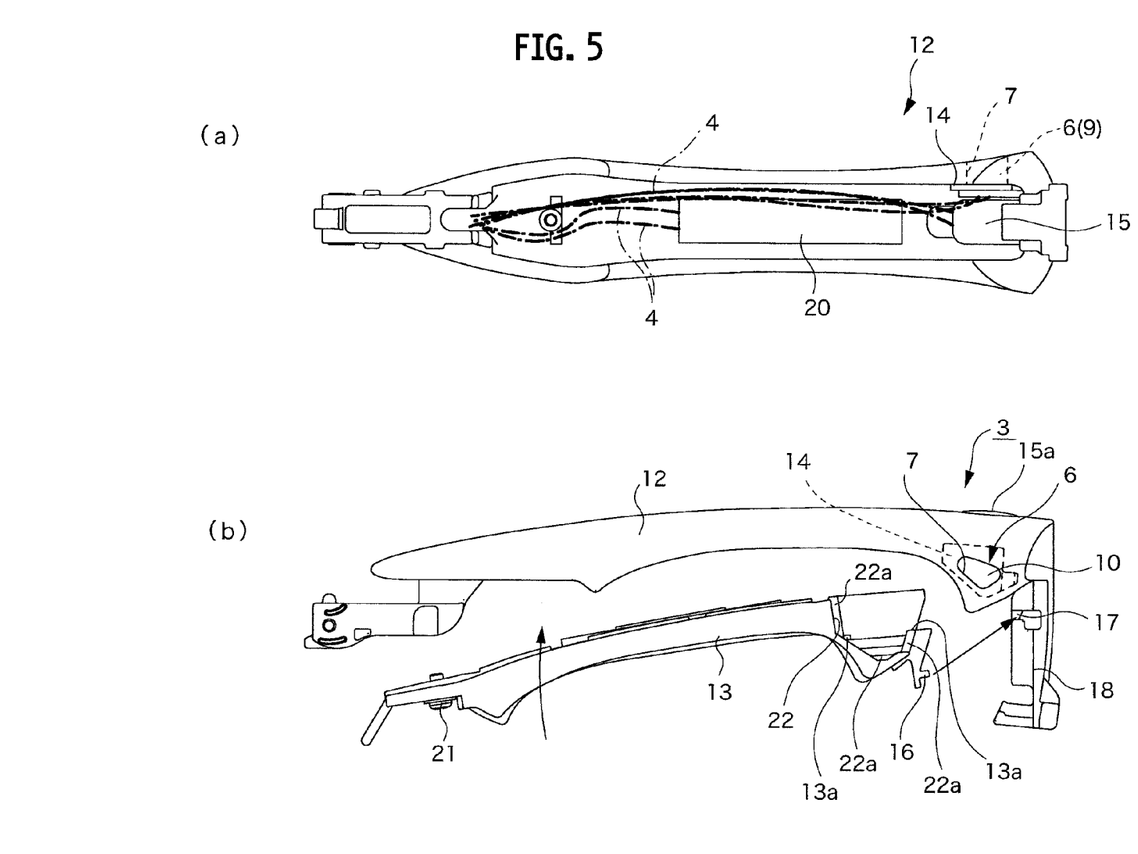
FIG. 5(a) is a back view of a front cover.
FIG. 5(b) is a side view showing coupling of a back cover thereto.
Figure 6:
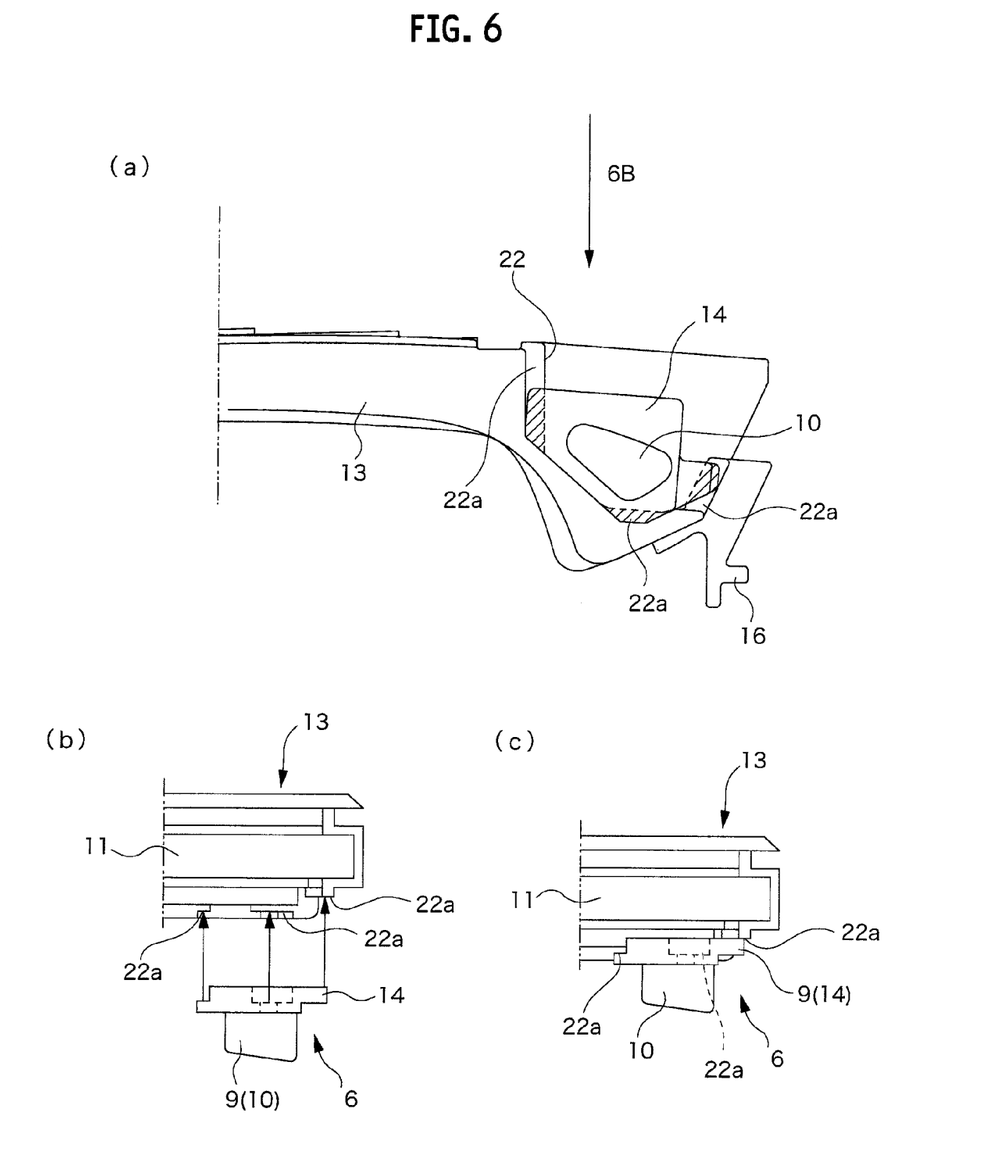
FIG. 6(a) is a side view showing a positional relationship with the back cover.
FIG. 6(b) is an arrow view of FIG. 6(a) in a direction 6B.
FIG. 6(c) is an arrow view of FIG. 6(a) in the direction 6B in a coupled state.

As shown in FIG. 3, in a state where the back cover 13 is secured, a surface of the fitting protruding portion 10 of the LED unit 6 is arranged at a position a little deeper in comparison with a surface (shown by a dashed line in FIG. 3) on which a peripheral edge of the irradiation opening 7 is formed. Accordingly, the surface concerned can be efficiently prevented from being scratched. Furthermore, since the light diffusing agent is mixed into the lens portion 9, and accordingly, a wide range of the ground can be irradiated.

Figure 7:
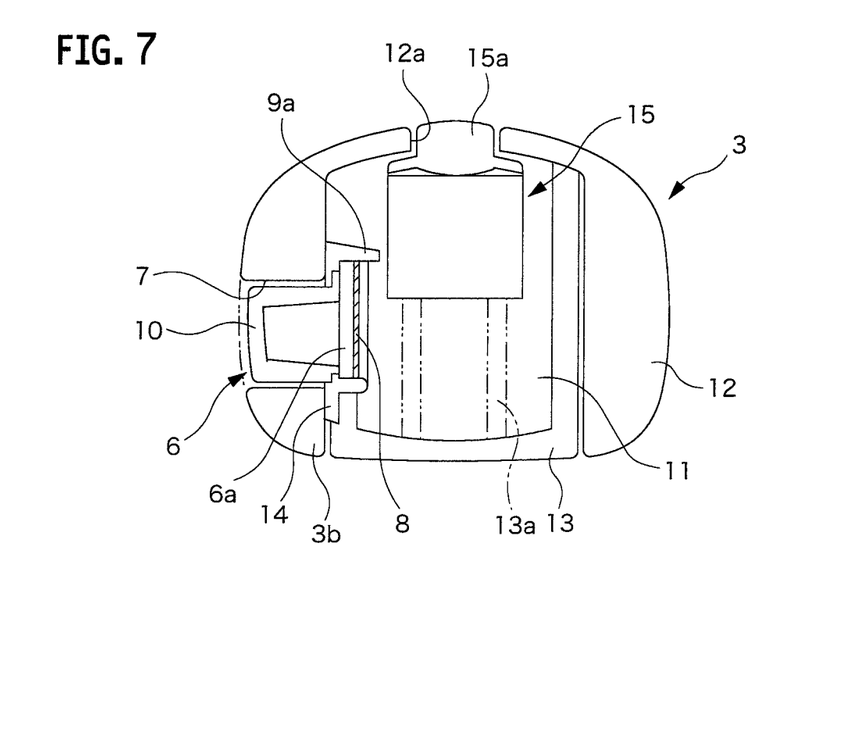
FIG. 7 is a cross-sectional view showing a modification example of a lighting device.
Figure 8:
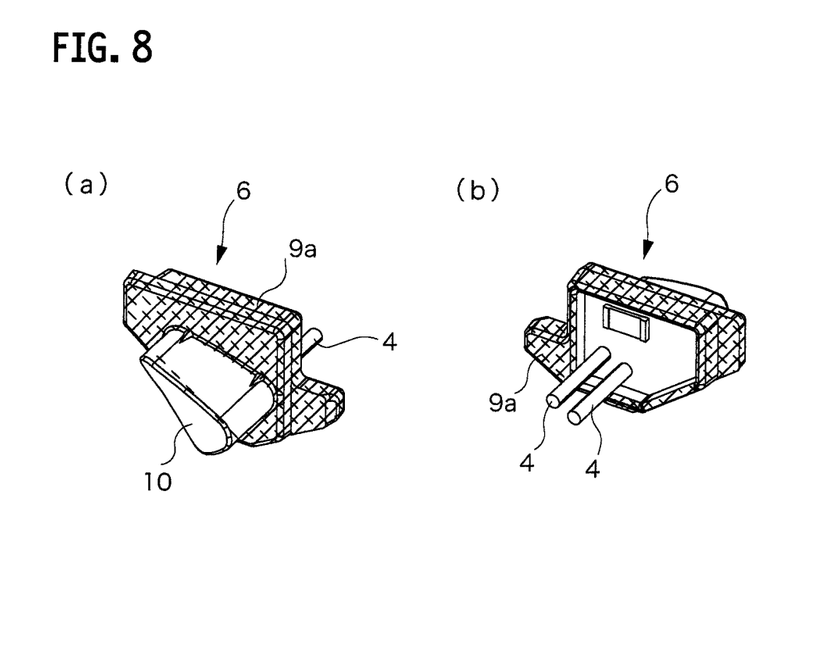
FIGS. 8(a) and 8(b) are perspective views of a lighting device of FIG. 7 when viewed from a back surface thereof.

Note that, in the above, the lens portion 9 of the lighting device 6 is extended to a side surface portion of the mounted board 6a, and accordingly, the light irradiated from the light emitting element 5 is also guided into a hollow portion of the operation handle 3, and leaks from the periphery of the button-ready opening 12a. As a result, the periphery of the operation switch 15 is lighted, and a position of the operation switch 15 can be informed. As shown in FIGS. 7 to 8(c), a light shielding portion 9a is formed on a surface of the lens portion 9, whereby a configuration can be adopted so that a quantity of the light irradiated onto the ground can be enhanced, and further, unnecessary light leakage from other regions can be prevented.

As shown in FIG. 7, the light shielding portion 9a can be formed in such a manner that the lens portion 9 is subjected to two-color molding, and opaque resin is used for the flange portion 14 and a portion corresponding to the hollow portion. Alternatively, as shown in FIGS. 8(a) and 8(b), the light shielding portion 9a can be formed in such a manner that the flange portion 14 and the portion corresponding to the hollow portion are colored, or are molded by the opaque resin.

Industrial Applicability

In accordance with the present invention, a vehicle door handle apparatus can be obtained, which is capable of illuminating the foot by means of a simple structure.

The invention claimed is:

1. A vehicle door handle apparatus comprising:
a handle base secured to a vehicle door;
an operation handle freely rotatably coupled to the handle base; and
a lighting device including a light emitting element that emits light by being fed with power through wire harnesses inserted through an inside of the operation handle,
wherein an irradiation opening is formed on a sidewall of the operation handle, the side wall being opposite to a ground in a state where the operation handle is attached onto the door, and
the lighting device is formed in a lens portion sealing the light emitting element in cooperation with sealing resin, and is secured to the operation handle by fitting, to the irradiation opening, a fitting protruding portion having a shape coinciding with the irradiation opening.

2. The vehicle door handle apparatus according to claim 1, wherein the operation handle is formed by coupling a front cover and a back cover to each other, the front cover including a harness insertion groove through which the wire harnesses are inserted, and allowing the irradiation opening to be formed on a sidewall of the front cover itself, the sidewall forming the harness insertion groove therein, and the back cover closing the harness insertion groove, and
the lighting device is secured to a predetermined position by sandwiching a flange portion formed on a base end of the fitting protruding portion between an inner wall surface of the harness insertion groove and the back cover.

3. The vehicle door handle apparatus according to claim 1, wherein the lens portion is formed by performing injection molding for translucent resin in which a light diffusing agent is diffused, and a surface of the lens portion, the surface being exposed to outside, is arranged to be located inward with respect to a peripheral edge surface of the irradiation opening.

4. The vehicle door handle apparatus according to claim 1, wherein, in the operation handle, an operation switch is arranged adjacent to the lighting device.

5. The vehicle door handle apparatus according to claim 1, wherein the back cover is secured to the front cover by screwing a rotation end portion rotated and allowed to abut against the front cover, the rotation end portion of the back cover being rotated about an engagement region of an engaging portion formed on one end portion of the back cover and an engaged portion formed on the front cover.

6. The vehicle door handle apparatus according to claim 1, wherein the lighting device is formed by covering a surface of a mounted board that mounts the light emitting element thereon with the lens portion that also serves as a case, and
the lens portion is covered with a light shielding portion except a light projecting surface from the irradiation opening.

7. A vehicle door handle apparatus comprising:
a handle base secured to a vehicle door;
an operation handle including a grip portion in a midpoint portion thereof, the operation handle having a front end coupled to the handle base freely rotatably; and
a lighting device including a light emitting element that emits light by being fed with power through wire harnesses inserted through an inside of the operation handle,
wherein the lighting device is arranged in a swelling portion formed on a rear end of the operation handle, and a lighting opening is formed in a sidewall portion of the operation handle, the sidewall portion facing to a ground.

8. The vehicle door handle apparatus according to claim 7, wherein the lighting device is formed by covering a surface of a mounted board that mounts the light emitting element thereon with a lens portion that also serves as a case, and the lens portion is covered with a light shielding portion except a light projecting surface from the irradiation opening.

\* \* \* \* \*